Patented July 29, 1941

2,250,663

UNITED STATES PATENT OFFICE 2,250,663

MOLDING POWDER OF UREA-FORMALDEHYDE RESIN CONTAINING A CURING ACCELERATOR

James Martyn Walter, Norton-on-Tees, England, assignor to Imperial Chemical Industries Limited, a corporation of Great Britain No Drawing. Application November 14, 1938, Serial No. 240,381. In Great Britain November 19, 1937

6 Claims. (Cl. 260—69)

This invention relates to molding powders of urea-formaldehyde resin and to accelerators therefor. Such molding powders consist essentially of a dry mixture of a condensation product of urea and formaldehyde and usually a filler, which product is transformable by the action of heat and pressure into an infusible mass. To accelerate this latter process, which is known as curing, it has been proposed to add various substances notably substances whose acidity is developed or increased on heating in the molding operation, e. g. organic acids containing halogen which liberate hydrogen halide on heating.

This invention has as an object to devise a new method of accelerating the curing of such resins. A further object is to devise such a method which will give resins having an improved surface finish. A still further object is to provide an accelerator for such resins which will also improve the storage properties of the molding powders made from such resins. A still further object is to provide new molding powders of urea-formaldehyde resin. A still further object is to devise a method of manufacturing new molding powders of urea-formaldehyde resin. Further objects will appear hereinafter. These objects are accomplished by the following invention.

I have now found that tri-methyl phosphate is an excellent accelerator for the curing of urea-formaldehyde resins and that its use leads to certain unexpected advantages. In particular, urea-formaldehyde molding powders containing tri-methyl phosphate as accelerator do not deteriorate during storage, as rapidly as existing known molding compositions containing latent acids, and give moldings of better colour and higher translucency.

According to the invention therefore I accelerate the curing of urea-formaldehyde resins by incorporating in the resin when in powder form in its uncured state an amount of trimethyl phosphate amounting to between 0.15% and 3.0% of the dry resin present.

The following examples illustrate but do not limit the invention.

Example 1

A urea-formaldehyde resin syrup made up by condensing 200 parts by weight of urea with 400 parts by weight of aqueous formaldehyde solution (37% formaldehyde) was incorporated with 168 parts by weight of paper pulp and dried to 1-2% free moisture content in a rotary drier. 440 parts by weight of the dried material so prepared are ground in a ball mill with the addition of 0.2% zinc stearate, 0.1% of cyclohexanol stearate and 0.5% of trimethyl phosphate. The product is a white, free-flowing powder which can be safely stored for periods up to six months at ordinary temperatures.

Example 2

A urea-formaldehyde resin syrup made up by condensing 200 parts by weight of urea with 540 parts of commercial formalin (40% formaldehyde by volume) was incorporated with paper pulp in the ratio of 200 parts by weight of paper to 740 parts by weight of syrup and the mixture dried as in Example 1. The dried material is then ground in a ball mill with 0.2% of zinc stearate, 1.0% of trimethyl phosphate and 2.0% of aldehyde ammonia. The product is a white, free-flowing powder which can be safely stored for periods up to six months at temperatures up to 35° C.

The amount of tri-methyl phosphate to be added is dependent upon the rate of cure desired, but usually quantities of the order of 0.15%-1.5% calculated on the dry resin are satisfactory. The accelerator is preferably intimately mixed with the ground condensation product, e. g. in a ball mill.

The usual stabilisers may, if desired be incorporated in the molding powders, the storage properties of the latter being thereby improved. Suitable stabilisers are ammonium carbonate, ammonium carbamate and aldehyde-ammonia. For example, the addition of 1% of ammonium carbonate to the composition of Example 1 enables it to be safely stored for periods of over six months at temperatures up to 35° C.

This invention is a valuable advance in the art as it discloses a method whereby an accelerator can be incorporated into a molding powder which will be highly effective at molding temperatures but will not make the powder unstable at storage temperatures, thereby making the use of stabilisers unnecessary except where exceptionally long storage periods are contemplated, and effecting economy and a simplification in manufacture.

As many apparently widely different embodiments of this invention may be made without departing from the spirit and scope thereof, it is to be understood that the invention is not limited to the specific embodiments thereof except as defined in the appended claims.

I claim:

1. In the process of preparing a molding powder which can be molded by heat and pressure, the step of intimately mixing an uncured dry urea-formaldehyde resin when in powder form with a curing accelerator consisting of trimethyl phosphate in an amount approximating 0.15 per cent to 3.0 per cent of said dry resin, said curing accelerator remaining ineffective at storage temperatures but being capable under the action of molding heat and pressure of accelerating the curing of the molding powder into an infusible mass.

2. In the process of preparing a molding powder which can be molded by heat and pressure, the step of intimately mixing an uncured dry urea-formaldehyde resin when in powder form with a curing accelerator consisting of trimethyl phosphate in an amount approximating 0.15 per cent to 1.5 per cent of said dry resin, said curing accelerator remaining ineffective at storage temperatures but being capable under the action of molding heat and pressure of accelerating the curing of the molding powder into an infusible mass.

3. In the process of curing urea-formaldehyde resins by heat and pressure, the improvement which comprises accelerating the curing of said resins by intimately mixing with the uncured dry urea-formaldehyde resin when in powdered form a curing accelerator consisting of trimethyl phosphate in an amount approximating 0.15 per cent to 3.0 per cent of said dry resin, said curing accelerator remaining ineffective at storage temperatures, then subjecting the powdered mixture to molding heat and pressure thereby developing the action of said accelerator and accelerating the curing of said resin into an infusible mass.

4. A molding powder containing a powdered uncured dry urea-formaldehyde resin in intimate mixture with a curing accelerator consisting of trimethyl phosphate in an amount approximating 0.15 per cent to 3.0 per cent of said dry resin, said curing accelerator remaining ineffective at storage temperatures but being capable under the action of molding heat and pressure of accelerating the curing of the molding powder into an infusible mass.

5. In the process of preparing a molding powder which can be molded by heat and pressure, the steps of impregnating paper pulp with an uncured urea-formaldehyde resin syrup, drying and grinding the resin-impregnated pulp to form a dry powder, and when in powder form intimately mixing therewith a curing accelerator consisting of trimethyl phosphate in an amount approximating 0.15 per cent to 3.0 per cent of said dry resin, said curing accelerator remaining ineffective at storage temperatures but being capable under the action of molding heat and pressure of accelerating the curing of the molding powder into an infusible mass.

6. A molding powder containing a powdered uncured dry urea-formaldehyde resin in intimate mixture with a curing accelerator consisting of trimethyl phosphate in an amount approximating 0.15 per cent to 1.5 per cent of said dry resin, said curing accelerator remaining ineffective at storage temperatures but being capable under the action of molding heat and pressure of accelerating the curing of the molding powder into an infusible mass.

JAMES MARTYN WALTER.